Aug. 8, 1939.  L. S. BITTNER  2,168,950
BRAKE SHOE ADJUSTER
Filed March 28, 1939

Inventor
LEROY S. BITTNER
By Leesh & Radue
Attorneys

Patented Aug. 8, 1939

2,168,950

UNITED STATES PATENT OFFICE 2,168,950

BRAKE SHOE ADJUSTER

Leroy S. Bittner, Elysburg, Pa.

Application March 28, 1939, Serial No. 264,655

3 Claims. (Cl. 188—79.5)

This invention relates to a wear compensating device for hydraulic brakes, and more particularly to an automatic wear compensating and brake shoe positioner which maintains the brake shoe facing at substantially the same distance from the inner face of the vehicle brake drum regardless of the thickness or thinness of the facing.

This application is a continuation-in-part of my co-pending application, Serial No. 218,866, filed July 12, 1938, entitled Hydraulic brake system.

Figures 1, 2, 3:
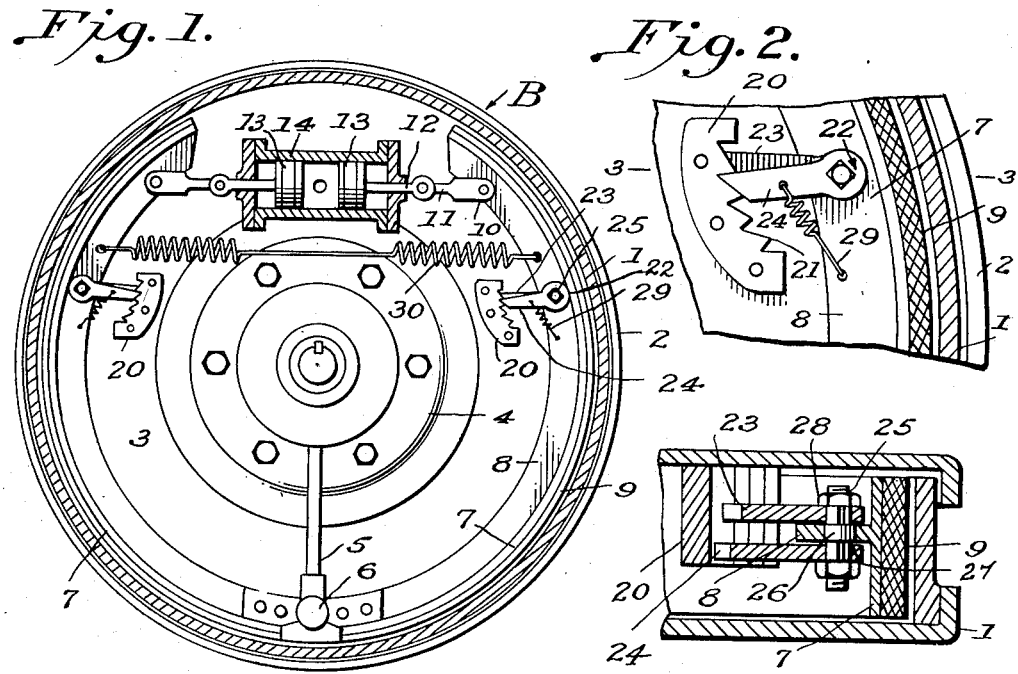
Fig. 1 is a vertical medial section of a vehicle brake assembly embodying the present invention.
Fig. 2 is an enlarged fragmental view of one of the automatic brake band wear compensating devices.
Fig. 3 is a fragmental horizontal section view of the compensating device taken on line 3—3 of Fig. 2.

Specifically in the drawing, B represents a conventional hydraulic brake, having a drum 1 rotative in a back or dust plate 2, the center portion 3 thereof being customarily provided with a circular center plate 4, to which a vertical downwardly extending fulcrum rod 5 is attached. The lower end of this rod 5 terminates in a horizontal pivot 6 to which the opposite expanding arcuate shoes 7 are hinged.

Each brake shoe 7 comprises a substantially semi-circular metallic web member 8, T shaped in cross section, and pivotally attached at their lower ends to the end of rod 5. The shoes are faced with a friction lining 9, which may be a molded or flexible band, riveted to the outer face thereof. The spaced apart upper ends of the shoes 7 are pivoted to connecting rods 10, which may take the form of pivoted links 11 and 12 extending outwardly from pistons 13 mounted in hydraulic cylinder 14, which is rigidly secured to the back or dust plate 2. Hydraulic pressure created in the braking system is introduced into the cylinder 14 between the pistons 13 to expand the shoes 7 and project facings 9 into frictional contact with the rotating wheel drums 1 to arrest the motion thereof.

A transverse spring member 30 is preferably hooked to each shoe to insure that the facings 9 will be retracted when the fluid pressure is relieved and not contact the drums except when the pistons are moved outwardly. However, it is most desirable to have the brake band facings normally positioned adjacent to, but just out of contact with the drum so that only a comparatively low fluid pressure and small outward movement of the shoes will be necessary to adequately contact the shoes with the drum to arrest the rotary movement of the wheel.

It is also very advantageous and economical to compensate for wear of the bands or shoes as their faces are worn down from use. These two factors of securing a proper normal position of the bands with relation to the drum and radial adjustment of the bands to compensate for wear and maintain the initial position is readily and easily taken care of by the mechanism hereinafter described.

The form of wear compensator disclosed in Figs. 1, 2, and 3 of the drawing comprises arcuate toothed segments 20 riveted or welded to the dust plate 3 on the right and left portions of the upper quadrant thereof and positioned near each shoe 7. The toothed segments 20 are so constructed and portioned that the radius of the lower portion of the segment is made on a smaller diameter than the upper portion, and, consequently the roots of the lower teeth are in closer proximity to the curvature of the brake shoes than are the upper teeth. Each arcuate segment cooperates with a double dog or pawl 22 having spaced apart parallel offset arms 23 and 24 rigidly secured on the squared ends of shaft 25. The arms are set at slightly different angles to one another so that the pointed ends of the pawls will alternately rest in adjacent teeth 21 generated on the inner arcuate face of the segment. The pawls are secured at opposite ends of a square ended shaft 25 having a central circular portion 26 which is mounted in an opening 27 bored in the web of the brake shoe 7. Any suitable end fastening means such as nuts 28 may be threaded on the ends of the shaft 25 to hold the pawls in position, and a coil spring 29 is hooked to the web and to one of the dogs of each compensator for urging the pawl against the segment teeth.

As before stated, each brake shoe is provided with such a device so that each shoe compensates for its individual wear without in any way disturbing the opposite shoe.

In operation when fluid is introduced into the cylinder 14, the pistons 13 are moved outwardly, carrying the links 11—12 and applying the shoes 7 against the brake drum. This causes considerable wear on the shoe facing and as either or both of the shoes are worn down, the pistons must naturally travel farther to apply the brakes. When wear has occurred in the brake facing and at the time that the brakes are applied, if there has been sufficient wear, the springs 29 will be able to pull the dogs downwardly and move them one notch lower on the segment. As before stated, when the lower dog 24 moves one notch, the upper dog 23 will move down one half notch and contact the top of the tooth previously holding the lower dog, see Fig. 2. After further wear has occurred, the upper pawl 25 moves downwardly and engages the ratchet tooth previously restraining the lower pawl 24. The lower pawl will now contact the top of the next succeeding tooth to create, in fact, a half step compensation, so that each positive engagement of the rack teeth by the pawls acts to move the brake shoe outwardly a distance comparable to one-half of the distance between the adjacent teeth. Thus the bands and pistons are prevented from returning to their original inward positions and the effective space between the brake facings and drum is maintained constant. By the time the double pawl has moved to the lowermost notch, the brake bands have been completely consumed and it is necessary to reline the brakes, at which time the upper dog 23 is replaced in the uppermost notch of the segment.

Figure 4:
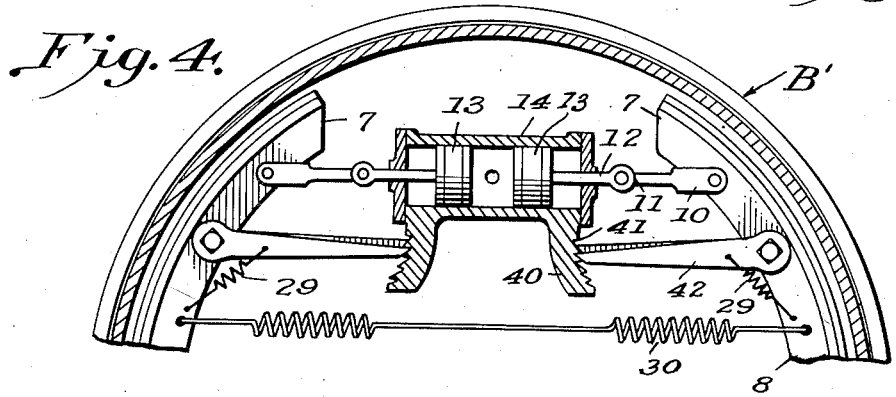
Fig. 4 is a partial vertical medial section of a modified form of the brake assembly.
Figure 5:
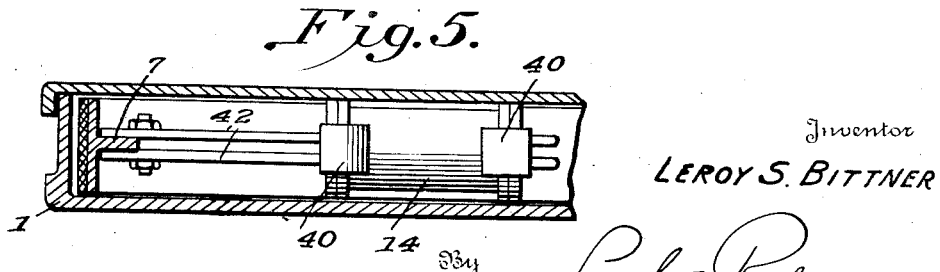
Fig. 5 is a fragmental view of the modified wear compensating device.

In the modified form of the invention disclosed in Figs. 4 and 5, the brake in its entirety is indicated by the reference B'. The general arrangement of the component parts of the brake in the modified form are the same as in the preferred form, and like numerals denote similar parts in the two structures. The salient difference is the arrangement and formation of the toothed segments which in the modified form are affixed to or formed integrally with the hydraulic cylinder 14 and consequently, are positioned nearer the upper ends of the opposite brake shoes. As shown in Fig. 4, the toothed segments 40 depend from adjacent the outer ends of the cylinder and the teeth 41 on the racks are engaged by inwardly extending pawls 42. These pawls are spaced apart and mounted at an angle to another similarly to the pawls in the preferred form and engage successive teeth on the arcuate integral segments 41 when wear occurs. The means of holding the pivoted ends of the pawls with their spring actuators and the operation of the compensator is similar to the first form.

The advantages of the modified form of wear compensator is particularly valuable for use on trucks and buses and at service stations, as it enables an entire unit, comprising of operating cylinder, linkage arms, shoes and wear compensators to be installed or removed at a single operation.

What I claim is:

1. In a hydraulic braking system, a source of fluid pressure leading to a plurality of wheel brakes, each of said wheel brakes comprising a rotatable brake drum, a dust plate therefor, a horizontal cylinder secured thereto, a pair of oppositely disposed pistons in said cylinder, linked piston rods secured to said pistons, said cylinder being in communication with said fluid pressure, oscillating arcuate brake shoes pivoted at one end to said piston rods and at their opposite ends to said dust plate, brake shoes adjustors consisting of arcuate serrated segments integrally formed on said cylinder, a pair of spaced fixed angle pawls pivoted to each of said brake shoes and engaging said serrated segments, and springs affixed to said shoes and to each of said pawls for progressively engaging the pawls with the serrations on said segments as the brake shoes are consumed from use.

2. In a hydraulic braking system, a source of fluid pressure leading from said source to a plurality of wheel brakes, each of said wheel brakes comprising a rotatable brake drum, a dust plate therefor, a horizontal cylinder secured thereto, a pair of oppositely disposed pistons in said cylinder, said cylinder being in communication with the source of fluid pressure, oscillating arcuate T-shaped brake shoes pivoted at one end to said pistons and at their opposite ends to said dust plate, facings on the out surface of said shoe, brake shoe adjustors consisting of arcuate serrated segments depending from said cylinder, a pair of spaced fixed angle pawls pivoted to opposite sides of said T-shaped brake shoes and engaging individual serrated segments, and springs affixed to said shoes and to each of said pawls for progressively engaging the pawls with the serrations on said segments as the brake shoes are consumed from use.

3. In a hydraulic braking system, a source of fluid pressure leading to a plurality of wheel brakes, each of said wheel brakes comprising a rotatable brake drum, a dust plate therefor, a horizontal cylinder secured thereto, a pair of oppositely disposed pistons in said cylinder, said cylinder being in communication with said fluid conduits, oscillating arcuate brake shoes pivoted at one end to said pistons and at their opposite ends to arcuate racks integrally formed and depending from adjacent the ends of said cyinder, a pair of spaced apart fixed angle pawls pivoted to each of said brake shoes and engaging its individual arcuate rack, and springs affixed to said shoes and to each of said pawls for progressively engaging the pawls with the serrations on said segments as the brake shoes are consumed from use.

LEROY S. BITTNER.